US010001870B2

(12) United States Patent
Li (10) Patent No.: US 10,001,870 B2
(45) Date of Patent: Jun. 19, 2018

(54) IN CELL TOUCH PANEL WITH UNIFORMLY-DISTRIBUTED GROOVES AND DISPLAY DEVICE (71) Applicants: Boe Technology Group Co., Ltd., Beijing (CN); Beijing Boe Optolectronics Technology Co., Ltd., Beijing (CN)

(72) Inventor: Yanchen Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 160 days.

(21) Appl. No.: 14/892,678

(22) PCT Filed: Apr. 13, 2015

(86) PCT No.: PCT/CN2015/076400
§ 371 (c)(1),
(2) Date: Nov. 20, 2015

(87) PCT Pub. No.: WO2016/110016
PCT Pub. Date: Jul. 14, 2016

(65) Prior Publication Data
US 2016/0357312 A1 Dec. 8, 2016

(30) Foreign Application Priority Data

Jan. 9, 2015 (CN) .......................... 2015 1 0012614

(51) Int. Cl.
G06F 3/041 (2006.01)
G06F 3/044 (2006.01)
(Continued)

(52) U.S. Cl.
CPC ........ *G06F 3/0416* (2013.01); *G02F 1/13338* (2013.01); *G02F 1/133514* (2013.01);
(Continued)

(58) Field of Classification Search
CPC ...... G06F 3/041; G06F 3/0412; G06F 3/0416; G06F 3/044; G06F 2203/04103;
(Continued)

(56) References Cited

U.S. PATENT DOCUMENTS

2004/0109122 A1* 6/2004 Kumagawa ....... G02F 1/134363
349/143
2008/0180622 A1* 7/2008 Horiguchi ......... G02F 1/134309
349/139
(Continued)

FOREIGN PATENT DOCUMENTS

CN 103793120 5/2014
CN 104020893 9/2014
(Continued)

OTHER PUBLICATIONS

Office Action from China Application No. 201510012614.6 dated Feb. 15, 2017.
(Continued)

Primary Examiner — Nathan Danielsen
(74) Attorney, Agent, or Firm — Calfee, Halter & Griswold LLP (57) ABSTRACT An In Cell touch panel and a display device are disclosed. The insulating layer comprises at least one groove at overlapping regions between each self capacitance electrode and the wires. Via holes penetrating the insulating layer are arranged in the insulating layer at overlapping regions between corresponding wires and self capacitance electrodes. Recesses not penetrating the insulating layer are arranged in the insulating layer at overlapping regions between wires and self capacitance electrodes apart from the corresponding wires and self capacitance electrodes. Thus, only the corresponding wires and self capacitance electrodes are electrically connected with each other, and the insulating layer is further provided with grooves at overlapping regions between wires and self capacitance electrodes which are not electrically connected. Grooves are distributed uniformly in the insulating layer and the problem of non-uniform displayed picture due to non-uniform distribution of via holes in the insulating layer is solved.

18 Claims, 8 Drawing Sheets (51) Int. Cl.
  *G02F 1/1333* (2006.01)
  *G02F 1/1335* (2006.01)
(52) U.S. Cl.
  CPC ............ *G06F 3/044* (2013.01); *G06F 3/0412* (2013.01); *G06F 2203/04111* (2013.01)
(58) Field of Classification Search
  CPC ....... G06F 2203/04111; G02F 1/13338; G02F 1/133514; G02F 1/1343; G02F 1/134309; G02F 2001/134345; G02F 2001/134354
  See application file for complete search history.

(56) References Cited

U.S. PATENT DOCUMENTS

| | | | |
|---|---|---|---|
| 2011/0234506 A1 | 9/2011 | Kim et al. | |
| 2011/0299024 A1* | 12/2011 | Lee, II | G02F 1/133371 349/144 |
| 2012/0218199 A1* | 8/2012 | Kim | G06F 3/0412 345/173 |
| 2015/0042601 A1* | 2/2015 | Lee, II | G06F 3/044 345/174 |
| 2015/0311237 A1* | 10/2015 | Jo | G02F 1/133345 438/637 |
| 2017/0003791 A1* | 1/2017 | Berget | G06F 3/044 |
| 2017/0003792 A1* | 1/2017 | Berget | G06F 3/0416 |

FOREIGN PATENT DOCUMENTS

| | | |
|---|---|---|
| CN | 104020912 | 9/2014 |
| CN | 104102402 | 10/2014 |
| CN | 104142772 | 11/2014 |

OTHER PUBLICATIONS

International Search Report and Written Opinion from PCT/CN15/76400 dated Sep. 25, 2015.

* cited by examiner

IN CELL TOUCH PANEL WITH UNIFORMLY-DISTRIBUTED GROOVES AND DISPLAY DEVICE

The present application is the U.S. national phase entry of PCT/CN2015/076400, with an international filing date of Apr. 13, 2015, which claims the benefit of Chinese Patent Application No. 201510012614.6, filed on Jan. 9, 2015, the entire disclosures of which are incorporated herein by reference.

FIELD OF THE INVENTION

The present invention relates to the field of touch technology, and particularly to an In Cell touch panel and display device.

BACKGROUND OF THE INVENTION

With the fast development of display technology, a touch screen panel has been gradually become popular in people's lives. Currently the touch screen panel is divided, on basis of its construction, into an Add On Mode touch screen panel, an On Cell touch screen panel, and an In Cell touch screen panel. In the Add On Mode touch screen panel, a touch screen panel and a liquid crystal display (LCD) panel are fabricated separately and then glued together to form a LCD panel with the touch function. The Add On Mode touch screen panel has the drawbacks of high fabrication cost, low light transmittance, and a large module thickness. Since touch electrodes of the In Cell touch screen panel are embedded inside the LCD panel, the overall module thickness is reduced and the fabricating cost is greatly decreased, making it the favorite choice of the panel manufacturers.

Currently, in the existing In Cell touch screen panels, a finger touch position is detected by virtue of the principle of mutual capacitance or self capacitance. In the case of detection by virtue of self capacitance, a plurality of self capacitance electrodes which are arranged in a same layer and insulated from each other is arranged in the touch screen panel. In case a human body does not touch the panel, each self capacitance electrode is subject to a capacitance of a constant value. In case the human body touches the panel, the corresponding self capacitance electrode is subject to a capacitance which is the sum of the constant value and the human body capacitance. A touch detecting chip can determine the touch position by detecting variation in capacitance value of each self capacitance electrode during a touch period. In the case of detection by virtue of self capacitance, the human body capacitance can act on all self capacitance, while the human body capacitance can only act on a projection capacitance in the case of mutual capacitance. Therefore, the touch variation amount which results from the human body's touching the panel is larger in the case of the touch screen panel in which the detection is based on mutual capacitance. Therefore, as compared with the touch screen panel based on mutual capacitance, the touch screen panel based on self capacitance can effectively improve the signal-to-noise ratio of touching detection, thus improving the accuracy in touch sensing.

Figure 1:
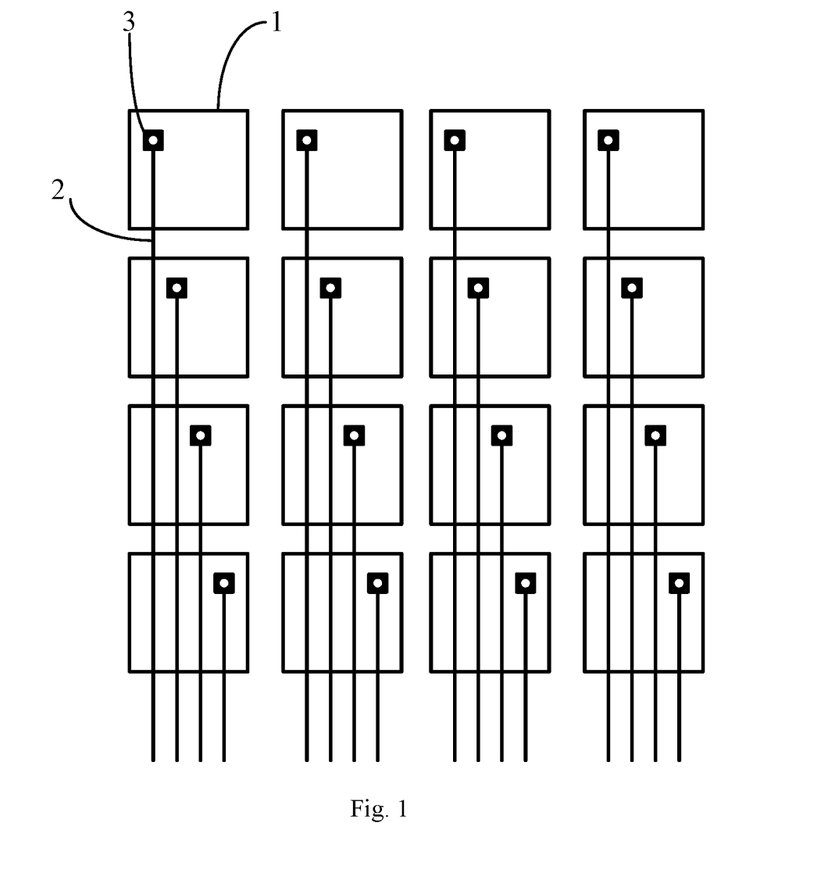
FIG. 1 is a structural view of the existing In Cell touch panel.

In the In Cell touch panel, wires which are connected with the self capacitance electrodes are generally provided for purpose of connecting the self capacitance electrodes with the touch detecting chip. In particular, as shown in FIG. 1, wires 2 lie below the self capacitance electrodes 1, each wire 2 is only connected with a corresponding self capacitance electrode 1 via a via hole 3, while the remaining self capacitance electrodes 1 are disconnected. However, in such a structure, via holes 3 are non-uniformly distributed in the whole display panel, thus resulting in uniformity of the displayed picture.

SUMMARY OF THE INVENTION

In view of this, embodiments of the present invention provide an In Cell touch panel and a display device, which avoid or at least alleviate one or more problems in the prior art. For example, according to technical solutions of the present invention, it is possible to avoid the problem of non-uniform displayed picture in the prior art.

Therefore, the present invention embodiment provide an In Cell touch panel, comprising: an upper substrate and a lower substrate which are arranged oppositely, a plurality of independent self capacitance electrodes which are arranged on a surface of the upper substrate facing the lower substrate or a surface of the lower substrate facing the upper substrate, wires which are arranged in a different layer from that of each self capacitance electrode and are electrically connected with each self capacitance electrode, and an insulating layer between the self capacitance electrodes and the wires;

the insulating layer comprises at least one groove at overlapping regions between each self capacitance electrode and the wires; wherein the grooves at the overlapping regions between each self capacitance electrode and the corresponding wires are via holes penetrating the insulating layer, each self capacitance electrode is electrically connected with the corresponding wires through respective via holes, and except for grooves for electrically connecting the corresponding wires with the self capacitance electrodes, the remaining grooves are recesses not penetrating the insulating layer.

Preferably, in an embodiment of the In Cell touch panel, each groove has a same shape and size.

Preferably, in an embodiment of the In Cell touch panel, each wire has a same extending direction.

Preferably, in order to realize an isometric capacitance design, in an embodiment of the In Cell touch panel, each wire has a same length.

Preferably, in order to ensure uniformity of grooves in the insulating layer, in an embodiment of the In Cell touch panel, as for each self capacitance electrode, grooves in the overlapping regions between the self capacitance electrodes and the wires which are not electrically connected are distributed in the same manner as grooves in the overlapping regions between the self capacitance electrodes and the wires which are electrically connected.

Preferably, in order to ensure uniformity of grooves in the insulating layer, in an embodiment of the In Cell touch panel, as for each wire, the distance between any two neighboring grooves which overlap the wires is constant.

Preferably, in order to simplify the fabrication process, in an embodiment of the In Cell touch panel, the plurality of independent self capacitance electrodes are arranged in same layer.

Preferably, in order to simplify the fabrication process and reduce the production cost, in an embodiment of the In Cell touch panel, each self capacitance electrode forms a common electrode layer on the surface of the lower substrate facing the upper substrate, and the In Cell touch panel further comprises a touch detecting chip;

the touch detecting chip is configured to apply a common electrode signal to each self capacitance electrode during a display period, and determine a touch position by detecting variation in capacitance value of each self capacitance electrode during a touch period.

Preferably, in order to simplify the fabrication process and reduce the production cost, in an embodiment, the In Cell touch panel further comprises a data line below the self capacitance electrode;

wherein each wire and the data line are arranged in a same layer and formed by a same material.

In particular, in an embodiment of the In Cell touch panel, the insulating layer between each self capacitance electrode and the wires which are electrically connected comprises a first passivation layer and a second passivation layer which are successively arranged above the wires;

the insulating layer between each self capacitance electrode and the wires which are not electrically connected comprises: the first passivation layer, a pixel electrode layer, and the second passivation layer which are successively arranged above the wires.

Preferably, in order to realize electrical connection between the self capacitance electrodes and the corresponding wires, in an embodiment of the In Cell touch panel, the via holes penetrate the first passivation layer and the second passivation layer;

the recesses penetrate the second passivation layer or penetrate the second passivation layer and the pixel electrode layer.

Preferably, in an embodiment, the In Cell touch panel further comprises a black matrix layer which is arranged on the surface of the lower substrate facing the upper substrate or the surface of the upper substrate facing the lower substrate;

an orthographic projection of a pattern of each wire onto the lower substrate falls within a region where a pattern of the black matrix layer is located.

Accordingly, the present invention embodiment further provides a display device, which comprises any one of the In Cell touch panel as described above.

In the In Cell touch panel and the display device of the present invention, the insulating layer comprises at least one groove at overlapping regions between each self capacitance electrode and the wires. Via holes penetrating the insulating layer are arranged in the insulating layer at overlapping regions between corresponding wires and self capacitance electrodes. Recesses not penetrating the insulating layer are arranged in the insulating layer at overlapping regions between wires and self capacitance electrodes apart from the corresponding wires and self capacitance electrodes. Thus, only the corresponding wires and self capacitance electrodes are electrically connected with each other, and the insulating layer is further provided with grooves at overlapping regions between wires and self capacitance electrodes which are not electrically connected. Grooves are distributed uniformly in the insulating layer and the problem of non-uniform displayed picture due to non-uniform distribution of via holes in the insulating layer in the prior art is solved.

DETAILED DESCRIPTION OF THE INVENTION

The In Cell touch panel and the display device of the present invention will be described in details hereinafter in embodiments by referring to the accompanying drawings.

In the accompanying drawings, the thickness and shape of each film does not represent real scale, and only intends to illustrate contents of the present invention.

Figure 2A:
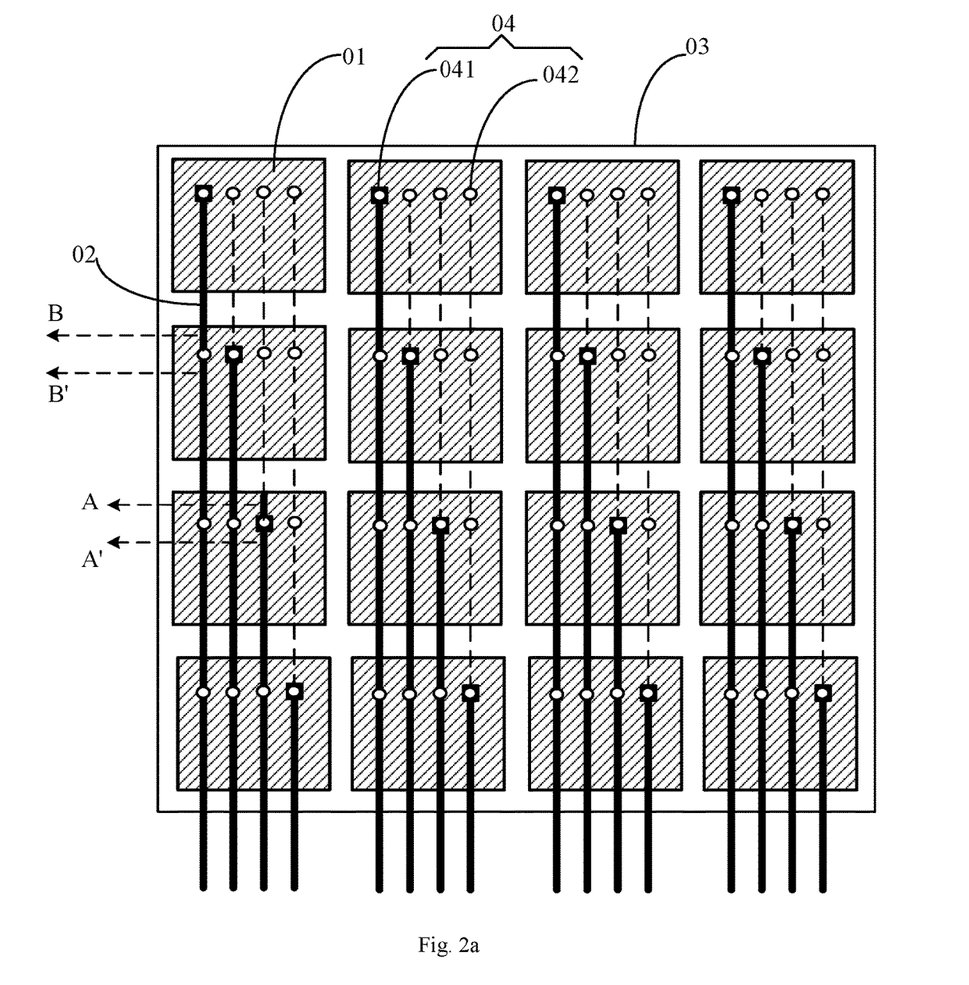
FIG. 2a is a structural view of an In Cell touch panel in an embodiment of the present invention.
Figure 2B:
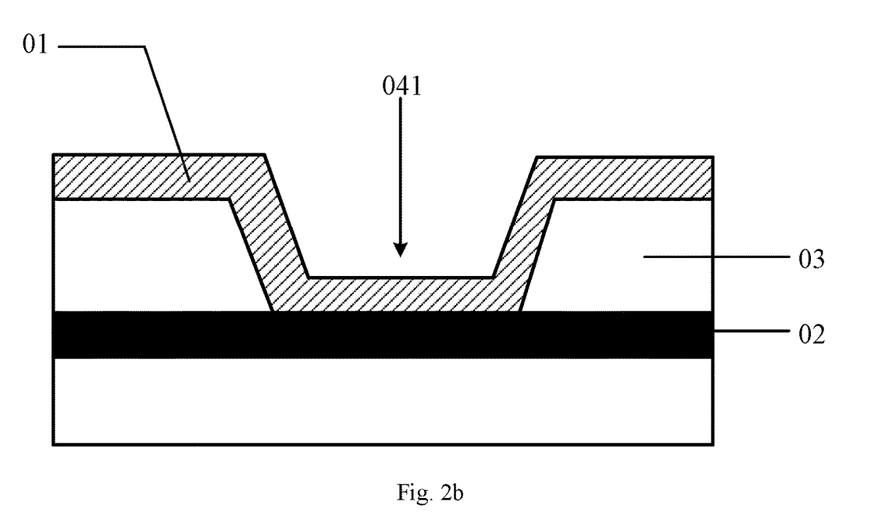
FIG. 2b is a cross-sectional view of the In Cell touch panel shown in FIG. 2a in the direction A-A'.
Figure 2C:
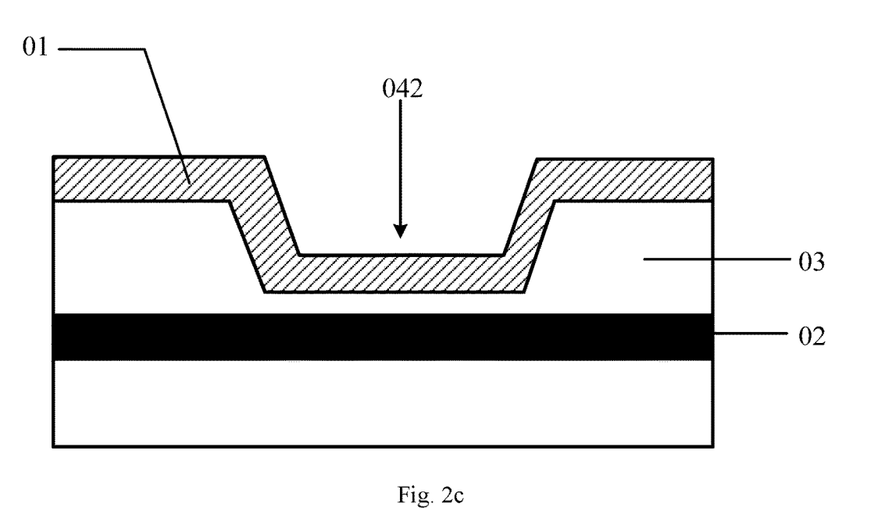
FIG. 2c is a cross-sectional view of the In Cell touch panel shown in FIG. 2a in the direction B-B'.

In an embodiment of the present invention, as shown in FIGS. 2a-2c, an In Cell touch panel comprises: an upper substrate and a lower substrate (not shown) which are arranged oppositely, a plurality of independent self capacitance electrodes 01 which are arranged on a surface of the upper substrate facing the lower substrate or a surface of the lower substrate facing the upper substrate, wires 02 which are arranged in a different layer from that of each self capacitance electrode 01 and are electrically connected with each self capacitance electrode 01, and an insulating layer 03 between the self capacitance electrodes 01 and the wires 02.

The insulating layer 03 comprises at least one groove 04 at overlapping regions between each self capacitance electrode 01 and the wires 02. As shown in FIG. 2b, the grooves 04 at the overlapping regions between each self capacitance electrode 01 and the corresponding wires 02 are via holes 041 penetrating the insulating layer 03, and each self capacitance electrode 01 is electrically connected with the corresponding wires 02 through respective via holes 041. As shown in FIG. 2c, except for grooves for electrically connecting the corresponding wires 02 with the self capacitance electrodes 01, the remaining grooves 04 are recesses 042 not penetrating the insulating layer 03.

In the In Cell touch panel of the present invention, the insulating layer comprises at least one groove at overlapping regions between each self capacitance electrode and the wires. Via holes penetrating the insulating layer are arranged in the insulating layer at overlapping regions between corresponding wires and self capacitance electrodes. Recesses not penetrating the insulating layer are arranged in the insulating layer at overlapping regions between wires and self capacitance electrodes apart from the corresponding wires and self capacitance electrodes. Thus, only the corresponding wires and self capacitance electrodes are electrically connected with each other, and the insulating layer is further provided with grooves at overlapping regions between wires and self capacitance electrodes which are not electrically connected. Grooves are distributed uniformly in the insulating layer and the problem of non-uniform displayed picture due to non-uniform distribution of via holes in the insulating layer in the prior art is solved.

It is noted that, in an embodiment of the In Cell touch panel, the insulating layer between the self capacitance electrodes and the wires can be formed from multiple layers or a single layer. Any insulating layer which insulates the self capacitance electrodes from the wires falls within the scope of the present invention.

Preferably, in order to ensure display uniformity, in an embodiment of the In Cell touch panel, each groove has a same shape and size. Further, in implementations, in an embodiment of the In Cell touch panel, the groove can be a circle, a square, or any other geometric shape.

Figure 3A:
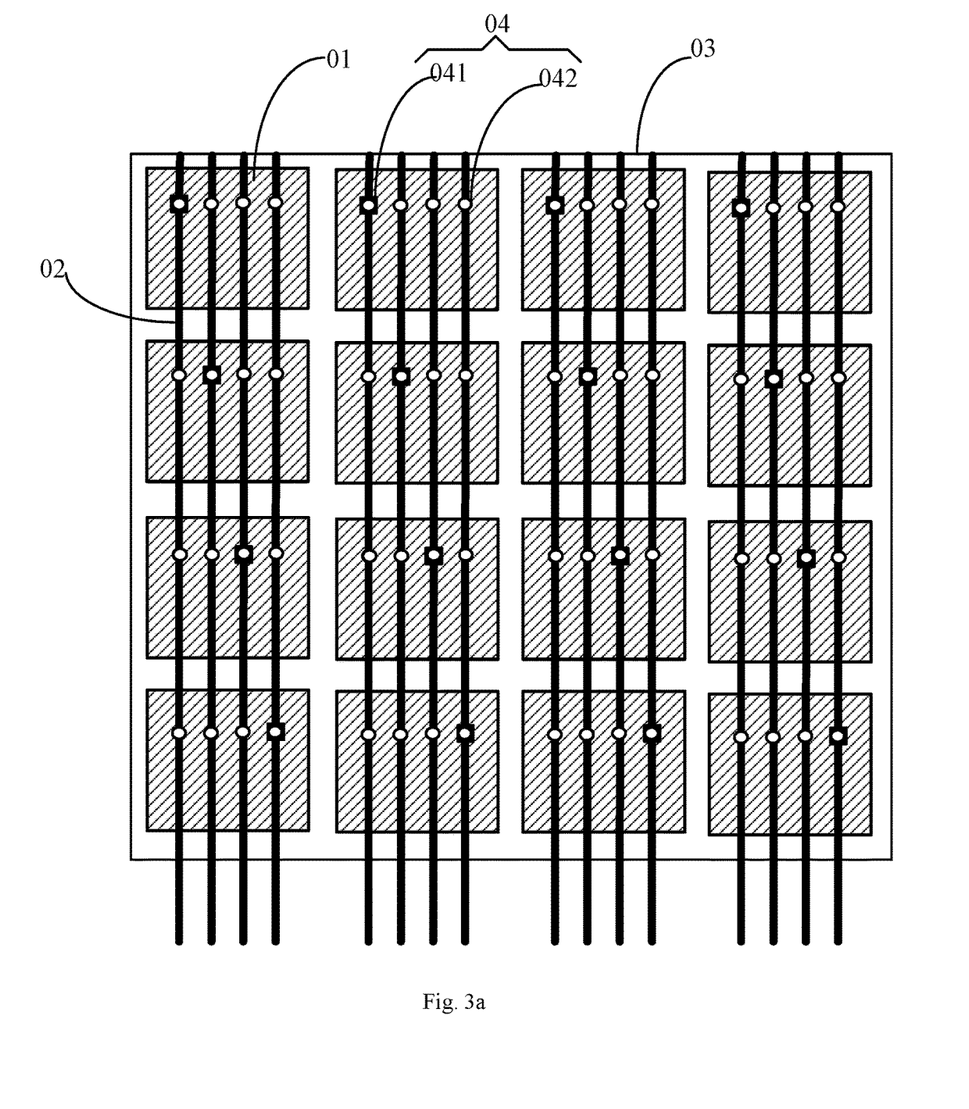
FIG. 3a is another structural view of an In Cell touch panel in an embodiment of the present invention.
Figure 3B:
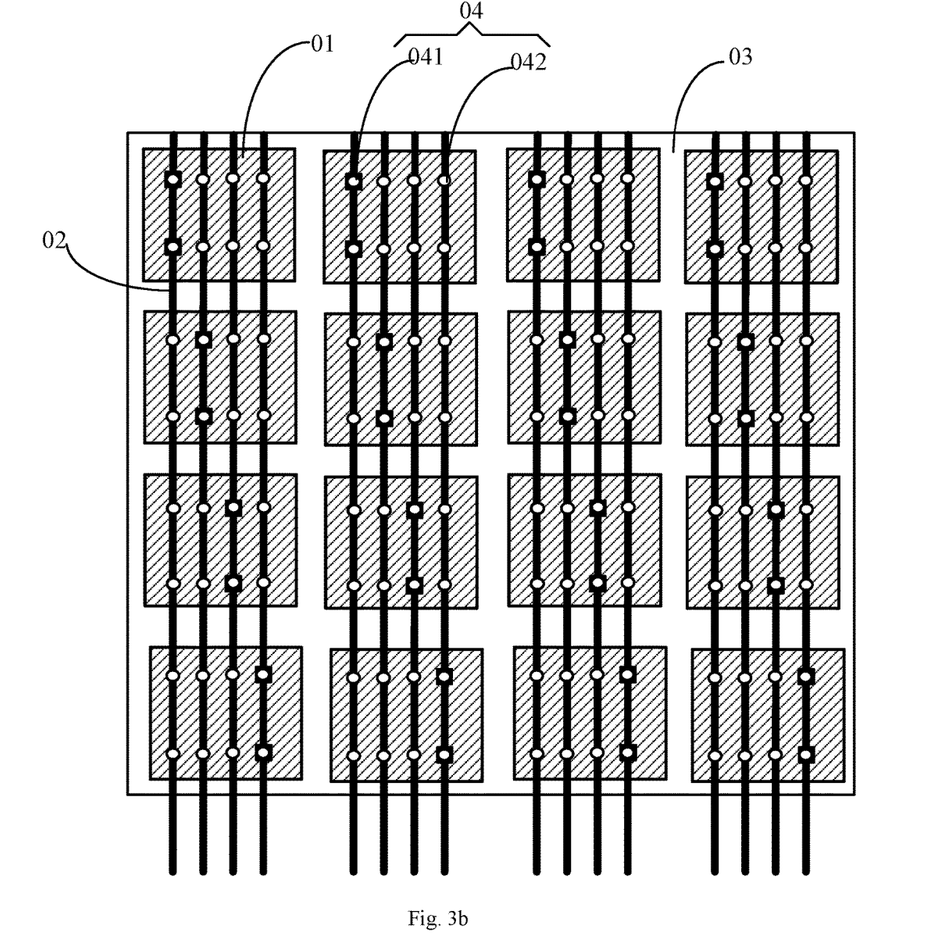
FIG. 3b is yet another structural view of an In Cell touch panel in an embodiment of the present invention.

Further, in order to reduce fabrication difficulty and distribute the wires uniformly, in an embodiment of the In Cell touch panel, as shown in FIG. 3a and FIG. 3b, each wire has a same extending direction.

Preferably, in order to realize an isometric capacitance design, in an embodiment of the In Cell touch panel, as shown in FIG. 3a and FIG. 3b, each wire 02 has a same length.

Further, in an embodiment of the In Cell touch panel, as shown in FIG. 3a and FIG. 3b, the plurality of independent self capacitance electrodes 01 are arranged in a matrix, and the wires 02 extend in the column direction or the row direction.

Preferably, in order to ensure uniformity of grooves in the insulating layer, in an embodiment of the In Cell touch panel, as for each self capacitance electrode, grooves in the overlapping regions between the self capacitance electrodes and the wires which are not electrically connected are distributed in the same manner as grooves in the overlapping regions between the self capacitance electrodes and the wires which are electrically connected.

Further, in an embodiment of the In Cell touch panel, as shown in FIG. 3a and FIG. 3b, as for each wire 02, the distance between any two neighboring grooves 04 which overlap the wires 02 is constant. Thus, it is ensured that all grooves in the In Cell touch panel are distributed uniformly, and uniformity of the displayed picture is ensured.

Preferably, in order to simplify the fabrication process, in an embodiment of the In Cell touch panel, the plurality of independent self capacitance electrodes are arranged in a same layer. In this way, a pattern for all self capacitance electrodes can be formed by performing the patterning process once, thus simplifying the process steps and reducing fabrication cost. Of course, the self capacitance electrodes can be formed in a layered manner.

Further, the above-mentioned In Cell touch panel is not only applicable to a Twisted Nematic (TN) LCD panel, but also to an Advanced Dimension Switch (ADS) LCD panel, a High-Advanced Dimension Switch (HADS) LCD panel, and an In-Plane Switch (IPS) LCD panel.

Further, in case the above-mentioned In Cell touch screen panel is applied to an ADS LCD panel, the planar common electrode layer lies below the slit-shaped pixel electrode. Namely, the common electrode layer lies between the lower substrate and the pixel electrode, and a passivation layer is further arranged between the common electrode layer and the pixel electrode. However, in case the above-mentioned In Cell touch screen panel is applied to a HADS LCD panel, the slit-shaped common electrode lies above the planar pixel electrode. Namely, the pixel electrode lies between the lower substrate and the common electrode, and a passivation layer is further arranged between the pixel electrode and the common electrode.

In particular, in case the In Cell touch panel of the present invention is applied to the ADS or HADS LCD panel, in order to simplify the fabrication process and reduce the production cost, the common electrode layer above the lower substrate can be multiplexed as self capacitance electrodes. Namely, each self capacitance electrode forms the common electrode layer on the surface of the lower substrate facing the upper substrate. The In Cell touch panel further comprises a touch detecting chip.

The touch detecting chip is configured to apply a common electrode signal to each self capacitance electrode during a display period, and determine a touch position by detecting variation in capacitance value of each self capacitance electrode during a touch period. In this way, in case the common electrode layer is divided into self capacitance electrodes to realize touch function, it is unnecessary to add any extra process to the existing process for fabricating an array substrate. Therefore, the production cost can be reduced and the production efficiency can be improved.

Further, according to the mode of LCD panel to which the In Cell touch panel will be applied, in case the common electrode layer is multiplexed as each self capacitance electrode, each self capacitance electrode can adopt a slit-shaped ITO electrode structure or a plate-shaped electrode structure in the aperture region of the pixel. Namely, in the HADS mode, each self capacitance electrode is formed by a slit-shaped electrode. In particular, the slit-shaped electrode structure is an ITO electrode which has a slit in the aperture region of the pixel. In the ADS mode, each self capacitance electrode is formed by a plate-shaped ITO electrode to meet the requirements for liquid crystal display, and the self capacitance electrodes can interact with an electric field from the human body through the slit of the pixel electrode. The details of the ADS LCD panel and the HADS LCD panel belong to the prior art, and are not repeated herein.

Generally, the touch screen panel has a density in the order of millimeters. Therefore, in practical implementations, the density and footprint of each self capacitance electrode is set according to the required touch density, so as to provide the required touch density. Generally, each self capacitance electrode is designed as a square electrode of the size of about 5 mm*5 mm. The display screen generally has a density in the order micrometers. Therefore, one self capacitance electrode generally corresponds to a plurality of pixels in the display screen.

In particular, since the common electrode layer is multiplexed as self capacitance electrodes in the above-mentioned touch screen panel, it is required to adopt time-division driving for the touch period and the display period, in order to reduce interference between the display signal and the touch signal. Besides, the display driving chip and the touch detecting chip can be integrated in a single chip, which further reduces production cost.

Figure 4A:
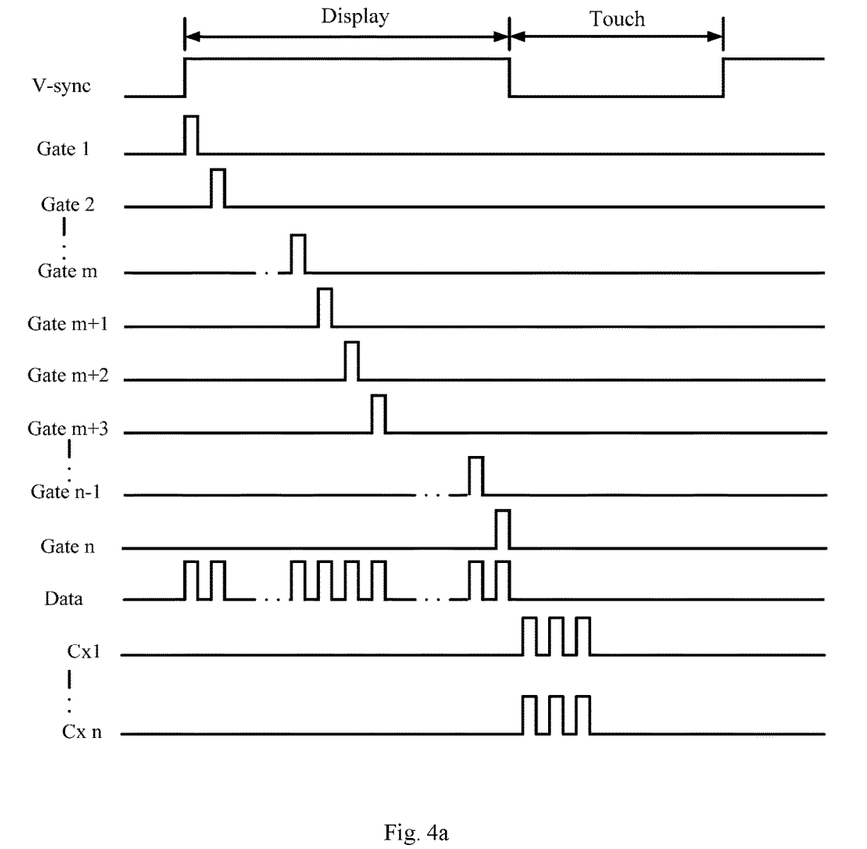
FIG. 4a is a driving timing of an In Cell touch panel in an embodiment of the present invention.
Figure 4B:
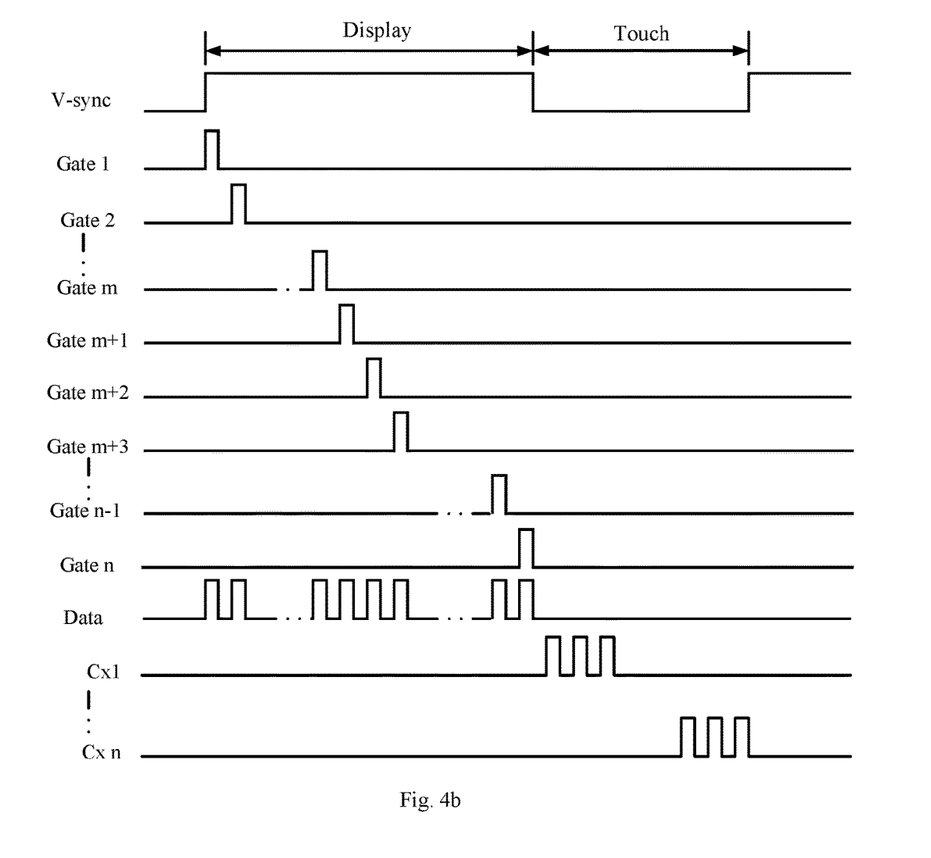
FIG. 4b is another driving timing of an In Cell touch panel in an embodiment of the present invention.

For example, in the driving timings shown in FIG. 4a and FIG. 4b, each display frame (V-sync) of the touch screen panel is divided into a display period (Display) and a touch period (Touch) in time. As shown in the driving timings of FIG. 4a and FIG. 4b, a display frame of the touch screen panel is 16.7 ms, 5 ms of which is the touch period and the remaining 11.7 ms of which is the display period. Of course, according to the processing capacity of the IC chip, the touch period and the display period can have durations different from those set forth above. During the display period (Display), a gate scan signal is successively applied to each gate signal line Gate 1, Gate 2 . . . Gate n in the touch screen panel, a gray level signal is applied to the data signal line Data, and the touch detecting chip which is connected with each self capacitance electrode Cx 1 . . . Cx n applies the common electrode signal to each self capacitance electrode Cx 1 . . . Cx n respectively, so as to realize the display function of the liquid crystal molecules. During the touch period (Touch), as shown in FIG. 4a, the touch detecting chip which is connected with each self capacitance electrode Cx 1 . . . Cx n applies a driving signal to each self capacitance electrode Cx 1 . . . Cx n simultaneously, and at a same time receives a feedback signal from each self capacitance electrode Cx 1 . . . Cx n. Optionally, as shown in FIG. 4b, the touch detecting chip which is connected with each self capacitance electrode Cx 1 . . . Cx n applies the driving signal to each self capacitance electrode Cx 1 . . . Cx n successively, and receives the feedback signal from each self capacitance electrode Cx 1 . . . Cx n. The feedback signal is analyzed to determine whether a touch occurs, so that the touch function is realized.

Further, in order to simplify the fabrication process and reduce the production cost, in an embodiment, the In Cell touch panel further comprises: a data line below the self capacitance electrode, and each wire and the data line are arranged in a same layer and formed by a same material. In this way, each wire can be formed in a same layer as the data line, new process is not introduced, and it is only required to modify the patterning process for the corresponding layers. Thus, the process step is simplified, the production cost is reduced, and the production efficiency is improved.

In particular, in case the In Cell touch panel is applied to the HADS LCD panel, a first passivation layer, a pixel electrode layer, and a second passivation layer are further arranged above the data line. In this way, the insulating layer between each self capacitance electrode and the wires which are electrically connected can comprise: a first passivation layer and a second passivation layer which are successively arranged above the wires;

the insulating layer between each self capacitance electrode and the wires which are not electrically connected can comprise: a first passivation layer, a pixel electrode layer, and a second passivation layer which are successively arranged above the wires. Here, the pixel electrode layer is maintained for the purpose of facilitating fabrication of recesses. Namely, during fabricating recesses, etching starts from the second passivation layer and stops up to the pixel electrode layer. In this manner, over-etching which may unnecessarily pierce the insulating layer can be avoided, thus ensuring the self capacitance electrodes are insulted from the wires at recesses.

Therefore, in implementations, in order to realize electrical connection between the self capacitance electrodes and the corresponding wires, in an embodiment of the In Cell touch panel, the via holes penetrate the first passivation layer and the second passivation layer.

In implementations, in order to avoid the self capacitance electrodes are electrically connected with other wires, in an embodiment of the In Cell touch panel, the recesses penetrate the second passivation layer, or penetrate the second passivation layer and the pixel electrode layer.

Preferably, in an embodiment of the In Cell touch panel, the first passivation layer has a thickness less than that of the second passivation layer, thus ensuring the via holes and the recesses have substantially a same size.

Further, in an embodiment of the In Cell touch panel, the wires generally have a width at positions corresponding to the via holes larger than that at other positions, which is similar with the prior art and is not repeated herein.

Further, since the data line is generally made from metallic materials, and the wires and the data line are formed from a same metallic materials, in order not to affect the normal display, in an embodiment, the In Cell touch panel further comprises: a black matrix layer which is arranged on the surface of the lower substrate facing the upper substrate or the surface of the upper substrate facing the lower substrate;

an orthographic projection of a pattern of each wire onto the lower substrate falls within a region where a pattern of the black matrix layer is located.

Figure 5A:
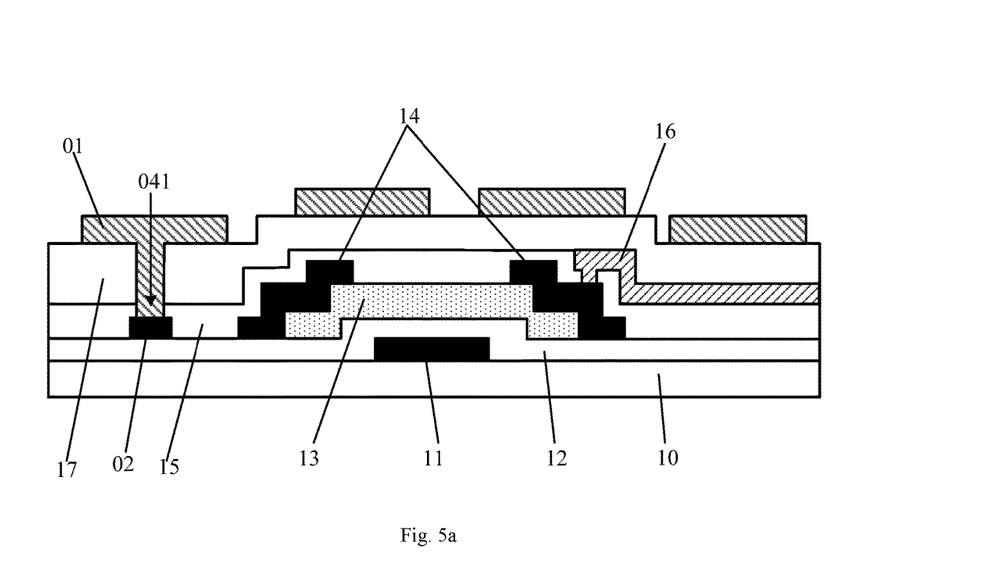
FIG. 5a and FIG. 5b are structural views of an In Cell touch panel in an embodiment of the present invention, respectively.
Figure 5B:
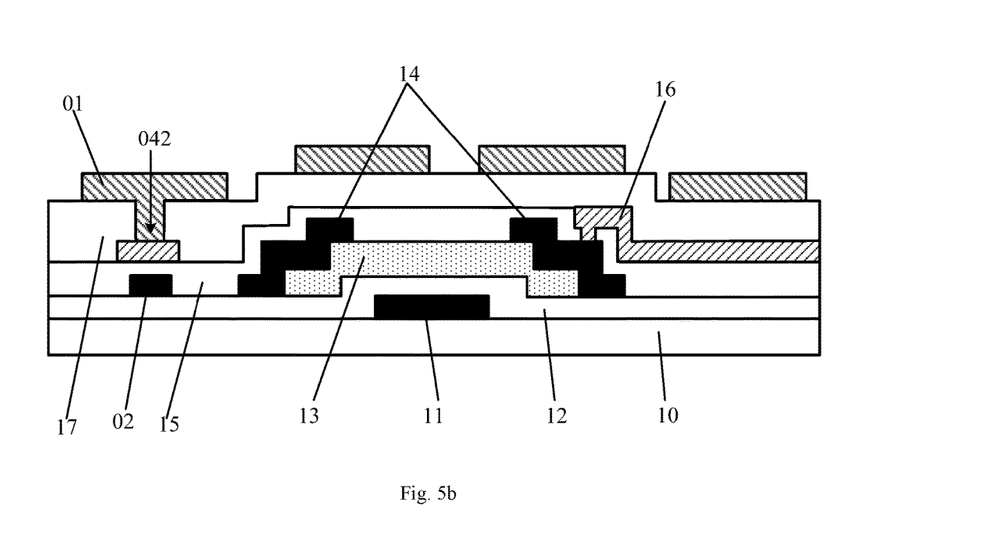

The In Cell touch panel in an embodiment of the present invention will be described hereinafter by referring to a specific embodiment. As shown in FIG. 5a and FIG. 5b, the In Cell touch panel comprises a baseplate 10, and further comprises a gate electrode 11; a gate insulating layer 12; an active layer 13; wires 02, source/drain electrode 14, and a data line (the data line is not shown in FIG. 5a and FIG. 5b) which are arranged in a same layer; a first passivation layer 15; a pixel electrode layer 16; a second passivation layer 17; and a common electrode layer formed by a self capacitance electrode 01 which are successively arranged above the baseplate 10. As shown in FIG. 5a, the via hole 041 penetrates the first passivation layer 15 and the second passivation layer 17, and the self capacitance electrode 01 is electrically connected with the corresponding wire 02 through a via hole 041. As shown in FIG. 5b, a recess 042 only penetrates the second passivation layer 17, thus ensuring the self capacitance electrode 01 is insulated from the wire 02 at the recess 042. An electrode below the recess 042 and corresponding to the wire 02 is also the pixel electrode layer 16, i.e., a maintained pixel electrode layer.

Based on a same inventive concept, an embodiment of the present invention further provides a display device, which comprises the above-mentioned In Cell touch screen panel. The display device can be any product or component with a display function, e.g., a mobile phone, a tablet computer, a TV set, a monitor, a notebook computer, a digital photo frame, and a navigator. For implementations of the display device, reference can be made to the above embodiments for the In Cell touch panel, which are not repeated for simplicity.

In the In Cell touch panel and the display device of the present invention, the insulating layer comprises at least one groove at overlapping regions between each self capacitance electrode and the wires. Via holes penetrating the insulating layer are arranged in the insulating layer at overlapping regions between corresponding wires and self capacitance electrodes. Recesses not penetrating the insulating layer are arranged in the insulating layer at overlapping regions between wires and self capacitance electrodes apart from the corresponding wires and self capacitance electrodes. Thus, only the corresponding wires and self capacitance electrodes are electrically connected with each other, and the insulating layer is further provided with grooves at overlapping regions between wires and self capacitance electrodes which are not electrically connected. Grooves are distributed uniformly in the insulating layer and the problem of non-uniform displayed picture due to non-uniform distribution of via holes in the insulating layer in the prior art is solved.

Although the present disclosure has been described above with reference to specific embodiments, it should be understood that the limitations of the described embodiments are merely for illustrative purpose and by no means limiting. Instead, the scope of the disclosure is defined by the appended claims rather than by the description, and all variations that fall within the range of the claims are intended to be embraced therein. Thus, other embodiments than the specific ones described above are equally possible within the scope of these appended claims.

The invention claimed is:
1. An in cell touch panel, comprising:
an upper substrate and a lower substrate which are arranged oppositely, a plurality of independent self capacitance electrodes which are arranged on a surface of the upper substrate facing the lower substrate or a surface of the lower substrate facing the upper substrate;

wires which are arranged in a different layer from that of the self capacitance electrodes and are electrically connected with each self capacitance electrode;

and an insulating layer between the self capacitance electrodes and the wires;

wherein the insulating layer comprises at least one groove at overlapping regions between the self capacitance electrodes and the wires;

wherein the grooves at the overlapping regions between the self capacitance electrodes and the corresponding wires are via holes penetrating the insulating layer, the self capacitance electrodes are electrically connected with the corresponding wires through respective via holes; and wherein except for grooves for electrically connecting the corresponding wires with the self capacitance electrodes, the remaining grooves are recesses not penetrating the insulating layer;

wherein the insulating layer between each self capacitance electrode and the wires which are electrically connected consists of a first passivation layer and a second passivation layer which are successively arranged above the wires; and wherein the insulating layer between the self capacitance electrodes and the wires which are not electrically connected consists of the first passivation layer, a pixel electrode layer, and the second passivation layer which are successively arranged above the wires, and wherein the recesses in the insulating layer only penetrate the second passivation layer so that the self capacitance electrode is electrically connected with the pixel electrode layer.

2. The in cell touch panel of claim 1, wherein each groove has a same shape and size.

3. The in cell touch panel of claim 1, wherein each wire has a same extending direction.

4. The in cell touch panel of claim 3, wherein each wire has a same length.

5. The in cell touch panel of claim 4, wherein as for each self capacitance electrode, grooves in the overlapping regions between the self capacitance electrodes and the wires which are not electrically connected are distributed in the same manner as grooves in the overlapping regions between the self capacitance electrodes and the wires which are electrically connected.

6. The in cell touch panel of claim 5, wherein as for each wire, the distance between any two neighboring grooves which overlap the wires is constant.

7. The in cell touch panel of claim 1, wherein the self capacitance electrodes form a common electrode layer on the surface of the lower substrate facing the upper substrate.

8. The in cell touch panel of claim 7, wherein the in cell touch panel further comprises a touch detecting chip, wherein the touch detecting chip is configured to apply a common electrode signal to each self capacitance electrode during a display period, and determine a touch position by detecting variation in capacitance value of each self capacitance electrode during a touch period.

9. The in cell touch panel of claim 8, further comprising a data line below the self capacitance electrode.

10. The in cell touch panel of claim 9, wherein the wires and the data lines are arranged in a same layer and formed by a same material.

11. The in cell touch panel of claim 9, further comprising: a black matrix layer which is arranged on the surface of the lower substrate facing the upper substrate or the surface of the upper substrate facing the lower substrate.

12. The in cell touch panel of claim 11, wherein an orthographic projection of a pattern of each wire onto the lower substrate falls within a region where a pattern of the black matrix layer is located.

13. The in cell touch panel of claim 1, wherein the via holes penetrate the first passivation layer and the second passivation layer.

14. A display device, comprising an in cell touch panel, wherein the in cell touch panel comprises:

an upper substrate and a lower substrate which are arranged oppositely;

a plurality of independent self capacitance electrodes which are arranged on a surface of the upper substrate facing the lower substrate or a surface of the lower substrate facing the upper substrate;

wires which are arranged in a different layer from that of the self capacitance electrodes and are electrically connected with the self capacitance electrodes; and an insulating layer between the self capacitance electrodes and the wires;

wherein the insulating layer comprises at least one groove at overlapping regions between the self capacitance electrodes and the wires;

wherein the grooves at the overlapping regions between the self capacitance electrodes and the corresponding wires are via holes penetrating the insulating layer, the self capacitance electrodes are electrically connected with the corresponding wires through respective via holes; and wherein except for grooves for electrically connecting the corresponding wires with the self capacitance electrodes, the remaining grooves are recesses not penetrating the insulating layer;

wherein the insulating layer between each self capacitance electrode and the wires which are electrically connected consists of a first passivation layer and a second passivation layer which are successively arranged above the wires; and wherein the insulating layer between the self capacitance electrodes and the wires which are not electrically connected consists of the first passivation layer, a pixel electrode layer, and the second passivation layer which are successively arranged above the wires, and wherein the recesses in the insulating layer only penetrate the second passivation layer so that the self capacitance electrode is electrically connected with the pixel electrode layer.

15. The display device of claim 14, wherein as for each self capacitance electrode, grooves in the overlapping regions between the self capacitance electrodes and the wires which are not electrically connected are distributed in the same manner as grooves in the overlapping regions between the self capacitance electrodes and the wires which are electrically connected.

16. The display device of claim 14, wherein the in cell touch panel further comprises a touch detecting chip, wherein the touch detecting chip is configured to apply a common electrode signal to the self capacitance electrodes during a display period, and determine a touch position by detecting variation in capacitance value of the self capacitance electrodes during a touch period.

17. The display device of claim 14, wherein the in cell touch panel further comprises: a black matrix layer which is arranged on the surface of the lower substrate facing the upper substrate or the surface of the upper substrate facing the lower substrate.

18. The display device of claim 17, wherein an orthographic projection of a pattern of each wire onto the lower substrate falls within a region where a pattern of the black matrix layer is located.

* * * * *